(12) United States Patent
Kikuchi et al.

(10) Patent No.: US 6,529,489 B1
(45) Date of Patent: Mar. 4, 2003

(54) PLURAL COMMUNICATION CONNECTION SETTING METHOD

(75) Inventors: Nobuo Kikuchi, Tokyo (JP); Nobuyuki Kobayashi, Tokyo (JP); Masaaki Kusano, Tokyo (JP); Toshiyuki Kuze, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/249,319

(22) Filed: Feb. 12, 1999

(30) Foreign Application Priority Data

May 25, 1998 (JP) .............................. 10-142617

(51) Int. Cl.[7] .............................. H04L 12/50; H04Q 7/20
(52) U.S. Cl. .................... 370/331; 370/338; 370/395.1; 370/409; 455/436; 455/445
(58) Field of Search ................................ 370/252, 328, 370/329, 331, 338, 351, 357, 236, 388, 389, 395.1, 396, 397, 409; 455/422, 436, 445, 450

(56) References Cited

U.S. PATENT DOCUMENTS

| | | | | |
|---|---|---|---|---|
| 5,623,495 A | * | 4/1997 | Eng et al. | 370/397 |
| 5,757,783 A | * | 5/1998 | Eng et al. | 370/315 |
| 5,896,373 A | * | 4/1999 | Mitts et al. | 370/331 |
| 5,912,885 A | * | 6/1999 | Mitts et al. | 370/331 |
| 5,974,036 A | * | 10/1999 | Acharya et al. | 370/331 |

FOREIGN PATENT DOCUMENTS

| | | |
|---|---|---|
| JP | 61-172458 | 8/1986 |
| JP | 4-42861 | 7/1992 |
| JP | 5-41691 | 2/1993 |

\* cited by examiner

*Primary Examiner*—Alphus H. Hsu
(74) *Attorney, Agent, or Firm*—Birch, Stewart, Kolasch & Birch, LLP

(57) ABSTRACT

In a sequence for setting a communication channel via a communication network with a communication counter party, a plural communication connection setting method is comprised of: a plural ID requesting step at which a terminal and a relay switch which initiate a communication transmit a connection setting request based upon a single message on which a set of identification numbers (ID) for previously establishing a plurality of connections and a communication parameter is described in response to a predetermined request and a response answer; a rewriting step at which when one message for describing the plural IDs set is received, if the request is available, then the corresponding portions of the corresponding management (routing) table are sequentially rewritten to be managed; and a plural ID response step at which when the rewriting operations corresponding to the plural ID sets are accomplished, a setting response is returned by way of one message on which the plural IDs are written to the setting request source.

7 Claims, 24 Drawing Sheets

FIG. 4

GCID FORMAT

| MOBILE TERMINAL ATM ADDRESS |
|---|
| LOCAL CONNECTION ID |

FIG. 5

CONNECTION MANAGEMENT TABLE OF MOBILE ATM TERMINAL

| LOCAL CID | VPI/VCI | COUNTER PARTY TERMINAL ATM ADDRESS | COUNTER PARTY TERMINAL ESW NUMBER | TRAFFIC PARAMETER | QOS PARAMETER | AAL PARAMETER |
|---|---|---|---|---|---|---|
| 1 | | | | | | |
| 2 | | | | | | |
| ⋮ | | | | | | |
| n-1 | | | | | | |
| n | | | | | | |

FIG. 6

CONNECTION MANAGEMENT TABLE OF EDGE SWITCH

| ACCESS POINT | MOBIL ATM TERMINAL ATM ADDRESS | LOCAL CID | VPI/VCI | COUNTER PARTY TERMINAL ATM ADDRESS | COUNTER PARTY TERMINAL ESW NUMBER | TRAFFIC PARAMETER | QOS PARAMETER | AAL PARAMETER |
|---|---|---|---|---|---|---|---|---|
| (1) | (1) | (1) | | | | | | |
| | | ......... | | | | | | |
| | | (n) | | | | | | |
| | (k) | (1) | | | | | | |
| | | ......... | | | | | | |
| | | (n) | | | | | | |
| ......... | | | | | | | | |
| (j) | | | | | | | | |

FIG. 7

INFORMATION ELEMENT REQUIRED FOR HO_REQUEST MESSAGE

| MOBILE TERMINAL ATM ADDRESS |
| --- |
| LOCAL CONNECTION ID LIST |
| TARGET AP LIST |
| OLD AP |

FIG. 8

INFORMATION ELEMENT REQUIRED FOR HO_RESPONSE MESSAGE

| MOBILE TERMINAL ATM ADDRESS |
| --- |
| HO ACCEPTANCE LOCAL CONNECTION ID LIST |
| NEW AP |
| OLD AP |

FIG. 9

INFORMATION ELEMENT REQUIRED FOR HO_REQUEST_QUERY MESSAGE

| MOBILE TERMINAL ATM ADDRESS |
|---|
| LOCAL CONNECTION ID-1 |
| QoS PARAMETER-1 |
| LOCAL CONNECTION ID-2 |
| QoS PARAMETER-2 |
| ⋮ |
| LOCAL CONNECTION ID-m |
| QoS PARAMETER-m |
| OLD AP |

FIG. 10

INFORMATION ELEMENT REQUIRED FOR HO_REQUEST_RESPONSE MESSAGE

| MOBILE TERMINAL ATM ADDRESS |
|---|
| HO ACCEPTANCE LOCAL CONNECTION ID LIST |

FIG. 11

INFORMATION ELEMENT REQUIRED FOR VCs_HO_REQUEST MESSAGE

| MOBILE TERMINAL ATM ADDRESS |
|---|
| LOCAL CONNECTION ID LIST |
| NEW AP |
| OLD AP |

FIG. 12

INFORMATION ELEMENT REQUIRED FOR VCs_SETUP MESSAGE

| ARRIVED SW NUMBER |
|---|
| ISSUED SW NUMBER |
| MOBILE TERMINAL ATM ADDRESS |
| LOCAL CONNECTION ID-1 |
| CONNECTION IDENTIFIER (VPI/VCI)-1 |
| ATM TRAFFIC PARAMETER-1 |
| QOS PARAMETER-1 |
| AAL PARAMETER-1 |
| LOCAL CONNECTION ID-2 |
| ⋮ |
| LOCAL CONNECTION ID-m |
| CONNECTION IDENTIFIER (VPI/VCI)-m |
| ATM TRAFFIC PARAMETER-m |
| QOS PARAMETER-m |
| AAL PARAMETER-m |

Rows LOCAL CONNECTION ID-1 through AAL PARAMETER-1: INFORMATION ELEMENT FOR LOCAL CID-1

Rows LOCAL CONNECTION ID-m through AAL PARAMETER-m: INFORMATION ELEMENT FOR LOCAL CID-m

FIG. 13

INFORMATION ELEMENT REQUIRED FOR VCs_CONNECT MESSAGE

| |
|---|
| ARRIVED SW NUMBER |
| ISSUED SW NUMBER |
| MOBILE TERMINAL ATM ADDRESS |
| LOCAL CONNECTION ID-1 |
| CONNECTION IDENTIFIER (VPI/VCI)-1 |
| LOCAL CONNECTION ID-2 |
| CONNECTION IDENTIFIER (VPI/VCI)-2 |
| ⋮ |
| LOCAL CONNECTION ID-m |
| CONNECTION IDENTIFIER (VPI/VCI)-m |

FIG. 14

INFORMATION ELEMENT REQUIRED FOR VCs_Down_Ready MESSAGE

| |
|---|
| MOBILE TERMINAL ATM ADDRESS |
| LOCAL CONNECTION ID LIST |

FIG. 15

INFORMATION ELEMENT REQUIRED FOR VCs_Up_Ready MESSAGE

| |
|---|
| MOBILE TERMINAL ATM ADDRESS |
| LOCAL CONNECTION ID LIST |

FIG. 16

INFORMATION ELEMENT REQUIRED FOR VCs_CONN_SWITCHED MESSAGE

| MOBILE TERMINAL ATM ADDRESS |
|---|
| LOCAL CONNECTION ID LIST |

FIG. 17

INFORMATION ELEMENT REQUIRED FOR VCs_HO_FAILURE MESSAGE

| MOBILE TERMINAL ATM ADDRESS |
|---|
| LOCAL CONNECTION ID LIST |
| OLD AP |

FIG. 18

INFORMATION ELEMENT REQUIRED FOR CONN_ACTIVATE MESSAGE

| MOBILE TERMINAL ATM ADDRESS |
|---|
| LOCAL CONNECTION ID LIST |

FIG. 19

INFORMATION ELEMENT REQUIRED FOR VCs_CONN_ACTIVE MESSAGE

| MOBILE TERMINAL ATM ADDRESS |
|---|
| LOCAL CONNECTION ID-1 |
| CONNECTION IDENTIFIER (VPI/VCI)-1 |
| LOCAL CONNECTION ID-2 |
| CONNECTION IDENTIFIER (VPI/VCI)-2 |
| ⋮ |
| LOCAL CONNECTION ID-m |
| CONNECTION IDENTIFIER (VPI/VCI)-m |

FIG. 20

INFORMATION ELEMENT REQUIRED FOR VCs_RELEASE MESSAGE

| MOBILE TERMINAL ATM ADDRESS |
|---|
| LOCAL CONNECTION ID LIST |

FIG. 21

INFORMATION ELEMENT REQUIRED FOR VCs_RELEASE_COMPLETE MESSAGE

| MOBILE TERMINAL ATM ADDRESS |
|---|
| LOCAL CONNECTION ID LIST |

INFORMATION ELEMENT-1 REQUIRED FOR VCs_SETUP MESSAGE

FIG. 25

INFORMATION ELEMENT-1 REQUIRED FOR VCs_CONNECT MESSAGE

| ARRIVED TERMINAL NUMBER |
| --- |
| ISSUED TERMINAL NUMBER |
| CONNECTION IDENTIFIER (VPI/VCI)-1 |
| CONNECTION IDENTIFIER (VPI/VCI)-2 |
| ⋮ |
| CONNECTION IDENTIFIER (VPI/VCI)-m |

FIG. 26

INFORMATION ELEMENT-1 REQUIRED FOR VCs_RELEASE MESSAGE

| CONNECTION IDENTIFIER (VPI/VCI)-1 |
| --- |
| CONNECTION IDENTIFIER (VPI/VCI)-2 |
| ⋮ |
| CONNECTION IDENTIFIER (VPI/VCI)-m |

FIG. 27

INFORMATION ELEMENT-1 REQUIRED FOR VCs_RELEASE_COMPLETE MESSAGE

| CONNECTION IDENTIFIER (VPI/VCI)-1 |
| --- |
| CONNECTION IDENTIFIER (VPI/VCI)-2 |
| ⋮ |
| CONNECTION IDENTIFIER (VPI/VCI)-m |

FIG. 29

INFORMATION ELEMENT-2 REQUIRED FOR VCs_CONNECT MESSAGE

| ARRIVED TERMINAL NUMBER |
| --- |
| ISSUED TERMINAL NUMBER |
| ISSUED TERMINAL ATM ADDRESS |
| LOCAL CONNECTION ID-1 |
| CONNECTION IDENTIFIER (VPI/VCI)-1 |
| LOCAL CONNECTION ID-2 |
| CONNECTION IDENTIFIER (VPI/VCI)-2 |
| ⋮ |
| LOCAL CONNECTION ID-m |
| CONNECTION IDENTIFIER (VPI/VCI)-m |

FIG. 30

INFORMATION ELEMENT-2 REQUIRED FOR VCs_RELEASE MESSAGE

| ISSUED TERMINAL ATM ADDRESS |
| --- |
| LOCAL CONNECTION ID LIST |

FIG. 31

INFORMATION ELEMENT-2 REQUIRED FOR VCs_RELEASE_COMPLETE MESSAGE

| ISSUED TERMINAL ATM ADDRESS |
| --- |
| LOCAL CONNECTION ID LIST |

FIG. 34

INFORMATION ELEMENT-2 REQUIRED FOR VCs_CONNECT MESSAGE

| | |
|---|---|
| | ARRIVED SW NUMBER |
| | ISSUED SW NUMBER |
| INFORMATION ELEMENT FOR ATM TERMINAL-1 | TERMINAL ATM ADDRESS-1 |
| | LOCAL CONNECTION ID-1 |
| | CONNECTION IDENTIFIER (VPI/VCI)-1 |
| | LOCAL CONNECTION ID-2 |
| | CONNECTION IDENTIFIER (VPI/VCI)-2 |
| | ⋮ |
| | LOCAL CONNECTION ID-m |
| | CONNECTION IDENTIFIER (VPI/VCI)-m |
| INFORMATION ELEMENT FOR ATM TERMINAL-2 | ISSUED TERMINAL ATM ADDRESS-2 |
| | LOCAL CONNECTION ID-1 |
| | ⋮ |
| | ⋮ |
| INFORMATION ELEMENT FOR ATM TERMINAL-k | ISSUED TERMINAL ATM ADDRESS-k |
| | LOCAL CONNECTION ID-1 |
| | ⋮ |

FIG. 35

INFORMATION ELEMENT-2 REQUIRED FOR VCs_RELEASE MESSAGE

| |
|---|
| ISSUED TERMINAL ATM ADDRESS |
| LOCAL CONNECTION ID LIST |

INFORMATION ELEMENT-2 REQUIRED FOR VCs_RELEASE_COMPLETE MESSAGE

| ISSUED TERMINAL ATM ADDRESS |
| LOCAL CONNECTION ID LIST |

FIG. 38
PRIOR ART
GCID FORMAT

| MOBILE TERMINAL ATM ADDRESS |
|---|
| LOCAL CONNECTION ID |

FIG. 39
PRIOR ART
INFORMATION ELEMENT REQUIRED FOR HO_REQUEST MESSAGE

| GCID LIST |
|---|
| QoS PARAMETER (?) |
| MOBILE TERMINAL ATM ADDRESS |
| TARGET AP LIST |
| OLD AP |

FIG. 40
PRIOR ART
INFORMATION ELEMENT REQUIRED FOR HO_RESPONSE MESSAGE

| HO ACCEPTANCE GCID LIST |
|---|
| MOBILE TERMINAL ATM ADDRESS |
| NEW AP |
| HO_ID LIST |
| OLD AP |

FIG. 41
PRIOR ART

INFORMATION ELEMENT REQUIRED FOR HO_REQUEST_QUERY MESSAGE

| GCID LIST |
|---|
| MOBILE TERMINAL ATM ADDRESS |
| OLD AP |

FIG. 42
PRIOR ART

INFORMATION ELEMENT REQUIRED FOR HO_REQUEST_RESPONSE MESSAGE

| HO ACCEPTANCE GCID LIST |
|---|
| MOBILE TERMINAL ATM ADDRESS |
| HO_ID LIST |

FIG. 43
PRIOR ART

INFORMATION ELEMENT REQUIRED FOR VC_HO_REQUEST MESSAGE

| GCID |
|---|
| COS ALGORHYTHM (?) |
| NEW AP |
| OLD AP |

FIG. 44
PRIOR ART

INFORMATION ELEMENT ADDED TO SETUP MESSAGE

| GCID |
|---|
| MOBILE TERMINAL ATM ADDRESS |
| EMAS OF UPLINK |

FIG. 45
PRIOR ART

INFORMATION ELEMENT ADDED TO CONNECT MESSAGE

| GCID |
|---|
| MOBILE TERMINAL ATM ADDRESS |
| EMAS OF DOWNLINK |

FIG. 46
PRIOR ART

INFORMATION ELEMENT REQUIRED FOR Down_ready MESSAGE

| GCID |
|---|
| MOBILE TERMINAL ATM ADDRESS |
| HO ID |

FIG. 47
PRIOR ART

INFORMATION ELEMENT REQUIRED FOR Up_ready MESSAGE

| GCID |
|---|
| MOBILE TERMINAL ATM ADDRESS |

FIG. 48
PRIOR ART

INFORMATION ELEMENT REQUIRED FOR HO_FAILURE MESSAGE

| GCID |
|---|
| ATM ADDRESS (?) OF COS |
| MOBILE TERMINAL ATM ADDRESS |
| OLD AP |

FIG. 49
PRIOR ART

INFORMATION ELEMENT REQUIRED FOR CONN_ACTIVATE MESSAGE

| GCID LIST |
| --- |
| VCI MAPPING |
| MOBILE TERMINAL ATM ADDRESS |
| MAC INFORMATION |
| DR FLAG |

FIG. 50
PRIOR ART

INFORMATION ELEMENT REQUIRED FOR CONN_ACTIVE MESSAGE

| GCID |
| --- |
| VCI MAPPING |

FIG. 51
PRIOR ART

INFORMATION ELEMENT ADDED TO RELEASE MESSAGE

| GCID |
| --- |
| MOBILE TERMINAL ATM ADDRESS |

FIG. 52
PRIOR ART

INFORMATION ELEMENT ADDED TO RELEASE_ACK MESSAGE

| GCID |
| --- |
| MOBILE TERMINAL ATM ADDRESS |

PLURAL COMMUNICATION CONNECTION SETTING METHOD

BACKGROUND OF THE INVENTION

1. Field of the Invention

The present invention relates to a communication connection setting method for setting a communication connection between communication nodes, and between a communication node and a communication terminal. More specifically, the present invention is directed to a setting method of a communication connection caused by a hand-over of a mobile communication network.

2. Description of the Related Art

Conventionally, for instance, in a mobile communication with using an asynchronous transfer mode (ATM mode), as a communication connection (ATM connection) setting method where a hand-over is employed as a trigger, such an ATM setting method is described in the card with message ATMF97-0845 of the ATM forum. FIG. 37 represents this ATM connection setting method. That is, the following connection setting method is employed. In this drawing, a branch communication node (crossover switch=COS, COS5c in this drawing) sets ATM connections one by one, which are required to be re-set due to the handover. This branch communication node receives the hand-over request message issued from the communication node (edge switch:ESW, ESW3c and ESW3d in the drawing) for storing the access point (AP: AP2c, AP2d in the drawing) to which the mobile ATM terminal (MT; MT16 in the drawing) is connected.

In the case that the mobile ATM terminal(MT) 1b is connected (handed over) to the access point 2d stored in the edge switch 3d and this mobile ATM terminal(MT) 1b is connected via the radio link to the access point(AP) 2c stored in the edge switch(ESW) 3c, for example, the mobile ATM terminal 1b first notifies the request of the hand-over to the edge switch 3c by way of the HO_REQUEST message (FIG. 39). Thereafter, the edge switch 3c transmits to the edge switch 3d for storing the new access point 2d, the HO_REQUEST_QUERY message (FIG. 41) for enquiring as to whether or not the mobile ATM terminal 1b can be handed over. Then, the edge switch 3d responds by way of the HO_REQUEST_RESPONSE message (FIG. 42)(these processes are indicated by step S61 of FIG. 37).

In this case, the list of the global connection ID(GCID) used to identify the ATM connections related to the hand-over is contained in each of the above-described messages.

As indicated in FIG. 38, for example, the global connection ID(GCID) is constituted by the ATM address of the mobile ATM terminal, and the local connection ID which is defined every mobile ATM terminal. This global connection ID(GCID) identifies the respective ATM connections within the network.

Thereafter, the edge switch 3c transmits the VC_HO_REQUEST message (FIG. 43) indicative of one of GCIDs related to the hand-over to the switch (crossover switch) COS5c at the point where the paths of the previous connections are intersected with the new path so as to request setting of the new ATM connections up-to the edge switch 3d. The crossover switch 5c transmits the SETUP message (FIG. 44) to the switch(SW) 4d so as to set the ATM connections up to the edge switch 3d (step S62 of FIG. 37). In this case, only one GCID is added to the SETUP message and the CONNECT message, respectively.

When setting of the ATM connections up to the edge switch 3d is completed, the crossover switch 5c switches the connection setting of the downlink (namely, direction from network to mobile terminal), and notifies this switching operation to the mobile ATM terminal 1b by way of the Down-ready message (FIG. 46) (in the case that setting of ATM connection fails, crossover switch notifies this failure by way of HO_FAILURE message (FIG. 48). In response to the Up-ready message (FIG. 47) issued from the mobile ATM terminal 1b, the crossover switch 5c switches the connection setting of the uplink (namely, direction from mobile terminal to network), and notifies this switching operation to the edge switch 3d by way of the CONN_SWITCHED message. Then, the mobile terminal 1b cuts the radio link with the access point 2c to establish the radio link with the access point 2d (step S63 of FIG. 37).

Thereafter, the mobile ATM terminal 1b requests to activate the ATM connection handed-over by the CONN_ACTIVATE message (FIG. 49). The edge switch 3d notifies to the mobile ATM terminal 1b with respect to each of the activated ATM connections by way of the CONN_ACTIVE message (FIG. 50)(step S64 of FIG. 37).

Based upon another ID owned in such a case that the mobile ATM terminal 1b simultaneously communicates with another mobile ATM terminal, namely, based upon the next ID after the switching operation of the above-described connection is accomplished, the sequence of the step S61 is carried out one time, and the process operations defined from the VC_HO_REQUEST message up to the Switch Up link message are repeated plural times equal to the total number of IDs. Thereafter, the transmission of the CONN_SWITCHED message, the switching operation of the radio link, and the transmission of the CONN_ACTIVATE message are carried out 1 time, and the transmission of the CONN_ACTIVE message is repeated plural times equal to the total number of IDs. Then, the process operation defined by the step S65 is repeated plural times equal to the total number of IDs. During this time, a plurality of transmission messages up to the VC_HO_REQUEST shown in FIG. 43, or the RELEASE_ACK shown in FIG. 52 are transmitted.

The above-explained conventional communication connection setting method employs the method for setting/cutting the connections one by one. As a result, in such a case that a plurality of connections are set/cut, similar process operations must be repeatedly carried out plural times. There is such a problem that a total number of messages is greatly increased which should be transmitted/received as to setting/cutting of the connections.

As a result, there is another problem that the time required to setting/cutting the connection is prolonged.

SUMMARY OF THE INVENTION

The present invention has been made to solve the above-described problems, and has an object to reduce a total number of messages and also shorten time by that a set of identifiers of plural communication connections is set to a communication connection setting message between communication nodes, and a communication connection setting message between a communication terminal and a communication node, and then a plurality of communication connections are combined with each other to be set.

A plural communication connection setting method, according to the present invention, is featured by that in a sequence for setting a communication channel via a communication network with a communication counter party, a plural communication connection setting method comprises:

a plural ID requesting step at which a terminal and a relay switch which initiate a communication transmit a connection setting request based upon a single message on which a set of identification numbers (ID) for previously establishing a plurality of connections and a communication parameter is described in response to a predetermined request and a response answer;

a rewriting step at which when one message for describing the plural IDs set is received, if the request is available, then the corresponding portions of the corresponding management (routing) table are sequentially rewritten to be managed; and a plural ID response step at which when the rewriting operations corresponding to the plural ID sets are accomplished, a setting response is returned by way of one message on which the plural IDs are written to the setting request source.

Also, furthermore, the plural communication setting method is featured by further comprising a plural ID cutting request step for transmitting a connection cutting request by way of one message on which a plurality of IDs are described in the connection cutting request; wherein:

when the one message on which the plurality of IDs are described is received, the relay switch completes the process operation corresponding thereto so as to respond.

Also, moreover, the plural communication connection setting method is featured by that the communication terminal is a mobile terminal, and when a hand-over operation is performed, a hand-over is requested to an edge switch equal to a mobile destination communication node by way of one message on which a set of plural IDs for indicating plural connections and of communication parameters has been described; and the relay switch performs a setting/cutting/responding process of the plural connections in response to the hand-over request by way of the one message.

In addition, the plural communication connection setting method is featured by that the plurality of IDs are combined with each other every same communication destination, and both setting and managing of the plural connections are carried out every the same communication destination.

Also, furthermore, the plural communication connection setting method is featured by that the plurality of IDs are combined with each other every edge switch for the communication destination terminal, and both setting and managing of the plural connections are carried out every the same edge switch.

Also, furthermore, the plural communication connection setting method is featured by that the plurality of IDs are combined with each other every crossover switch equal to a node where a new path of a connection is intersected with a old path of a connection, and both setting and managing of the plural connections are carried out every the same crossover switch.

Also, moreover the plural communication connection setting method is featured by that the list of the IDs is a list of a terminal address and a local connection ID.

BRIEF DESCRIPTION OF THE DRAWINGS

FIG. 4 is a diagram for indicating an example of a GCID format in the sequence of FIG. 1.

FIG. 5 is a diagram for indicating an example of a connection management table owned by a mobile terminal in the sequence of FIG. 1.

FIG. 6 is a diagram for showing an example of a connection management table owned by an edge switch in the sequence of FIG. 1.

FIG. 7 is a diagram for representing an example of information required for an HO_REQUEST message in the sequence of FIG. 1.

FIG. 8 is a diagram for showing an example of information required for an HO_RESPONSE message in the sequence of FIG. 1.

FIG. 9 is a diagram for indicating an example of information required for an HO_REQUEST_QUERY message in the sequence of FIG. 1.

FIG. 10 is a diagram for representing an example of information required for an HO_REQUEST_RESPONSE message in the sequence of FIG. 1.

FIG. 11 is a diagram for showing an example of information required for a VCs_HO_REQUEST message in the sequence of FIG. 1.

FIG. 12 is a diagram for indicating an example of information required for a VCs_SETUP message in the sequence of FIG. 1.

FIG. 13 is a diagram for representing an example of information required for a VCs_CONNECT message in the sequence of FIG. 1.

FIG. 14 is a diagram for showing an example of information required for a VCs_Down_ready message in the sequence of FIG. 1.

FIG. 15 is a diagram for indicating an example of information required for a VCs_Up_ready message in the sequence of FIG. 1.

FIG. 16 is a diagram for representing an example of information required for a VCs_CONN_SWITCHED message in the sequence of FIG. 1.

FIG. 17 is a diagram for showing an example of information required for a VCs_HO_FAILURE message in the sequence of FIG. 1.

FIG. 18 is a diagram for indicating an example of information required for a CONN_ACTIVATE message in the sequence of FIG. 1.

FIG. 19 is a diagram for representing an example of information required for a VCs_CONN_ACTIVE message in the sequence of FIG. 1.

FIG. 20 is a diagram for showing an example of information required for a VCs_RELEASE message in the sequence of FIG. 1.

FIG. 21 is a diagram for indicating an example of information required for a VCs_RELEASE_COMPLETE message in the sequence of FIG. 1.

FIG. 25 is a diagram for showing an example of information required for a VCs_CONNECT message in the sequence of FIG. 23.

FIG. 26 is a diagram for indicating an example of information required for a VCs_RELEASE message in the sequence of FIG. 23.

FIG. 27 is a diagram for representing an example of information required for a VCs_RELEASE_COMPLETE message in the sequence of FIG. 23.

FIG. 29 is a diagram for indicating an example of information required for a VCs_CONNECT QUERY message in the sequence of FIG. 23.

FIG. 30 is a diagram for representing an example of information required for a VCs_RELEASE message in the sequence of FIG. 23.

FIG. 31 is a diagram for showing an example of information required for a VCs_RELEASE_COMPLETE message in the sequence of FIG. 23.

FIG. 34 is a diagram for showing an example of information required for a VCS_CONNECT message in the sequence of FIG. 32.

FIG. 35 is a diagram for indicating an example of information required for a Vcs_RELEASE message in the sequence of FIG. 32.

FIG. 38 is a diagram for representing the format of GCID in the conventional sequential operation.

FIG. 39 is a diagram for showing an example of the HO_REQUEST format in the conventional sequence.

FIG. 40 is a diagram for representing an example of the HO_RESPONSE format in the conventional sequence.

FIG. 41 is a diagram for indicating an example of information required for the HO_REQUEST_QUERY message in the conventional sequence.

FIG. 42 is a diagram for representing an example of information required for the HO_REQUEST_RESPONSE message in the conventional sequence.

FIG. 43 is a diagram for showing an example of information required for the VC_HO_REQUEST message in the conventional sequence.

FIG. 44 is a diagram for indicating an example of information required for the SETUP message in the conventional sequence.

FIG. 45 is a diagram for representing an example of information required for the CONNECT message in the conventional sequence.

FIG. 46 is a diagram for showing an example of information required for the Down_ready message in the conventional sequence.

FIG. 47 is a diagram for indicating an example of information required for the UP_ready message in the conventional sequence.

FIG. 48 is a diagram for representing an example of information required for the HO_FAILURE message in the conventional sequence.

FIG. 49 is a diagram for showing an example of information required for the CONN_ACTIVATE message in the conventional sequence.

FIG. 50 is a diagram for indicating an example of information required for the CONN_ACTIVE message in the conventional sequence.

FIG. 51 is a diagram for representing an example of information added to the RELEASE message in the conventional sequence.

FIG. 52 is a diagram for showing an example of information added to the RELEASE_ACK message in the conventional sequence.

DETAILED DESCRIPTION OF THE PREFERRED EMBODIMENTS

Now, a description will be given in more detail of preferred embodiments of the invention with reference to the accompanying drawings.

Embodiment 1

Figure 1:
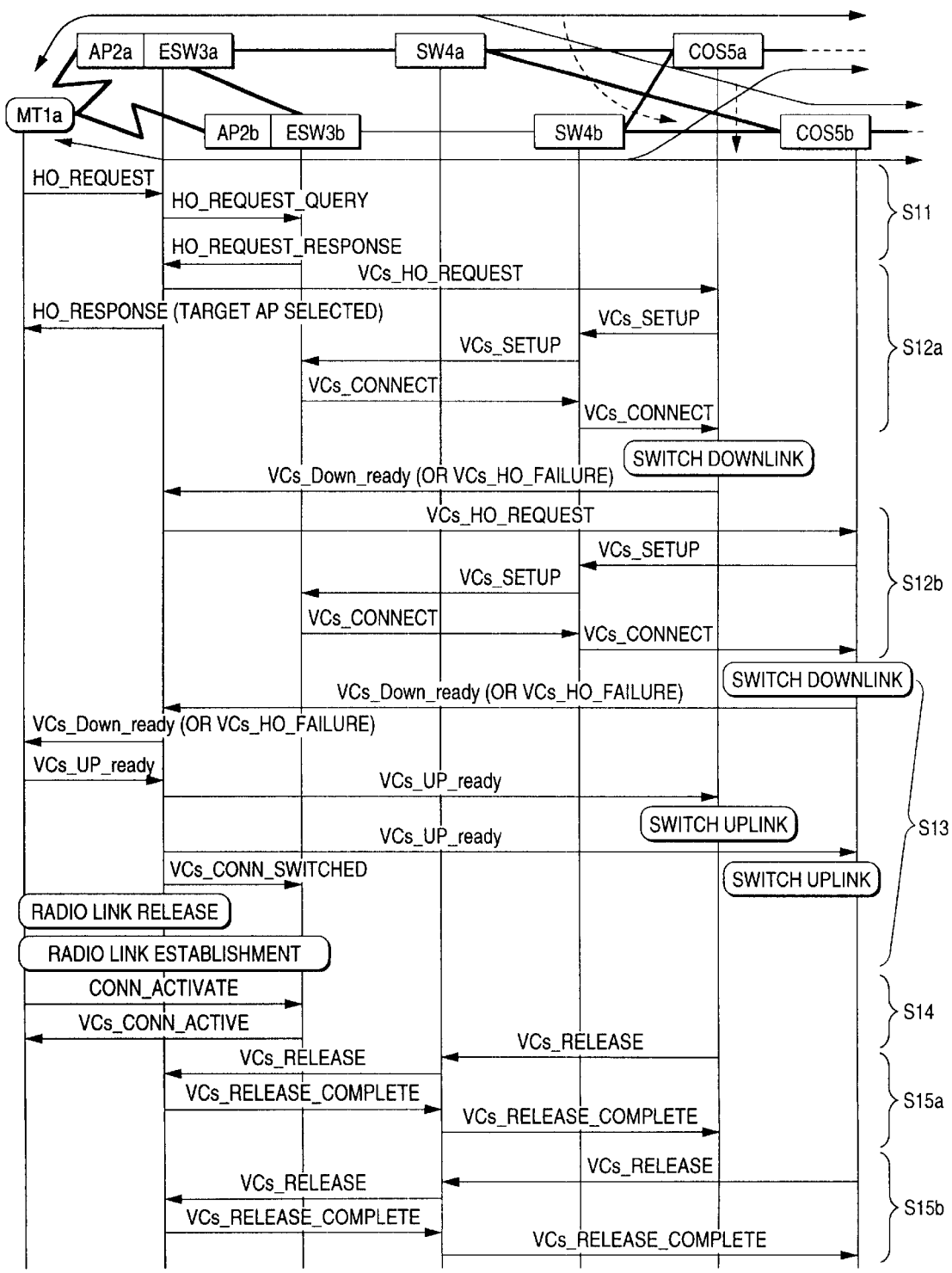
FIG. 1 is a diagram for representing a sequence of a method for setting a plurality of communications according to an embodiment 1 of the-present invention.

A plural communication connection setting method according to an embodiment 1 of the present invention, as shown in FIG. 1, employs such a system that a plurality of ATM connections are set once by setting information to a plurality of ATM connections to ATM connection setting message among ATM communication nodes (ATM switches). An apparatus such as a crossover switch and an edge switch which receives this plural ATM connection information combines request information with response information in a predetermined management unit at every communication counter party terminals, every communication counter party edge switches, and every communication crossover switches, and then outputs the combined information. Moreover, a table of the apparatus is rewritten to set/cut the ATM connection.

As the setting/cutting of the ATM connection, a total number of messages which should be transmitted/received can be reduced. As a result, a time period required to set/cut an ATM connection can be shortened.

Figure 2:
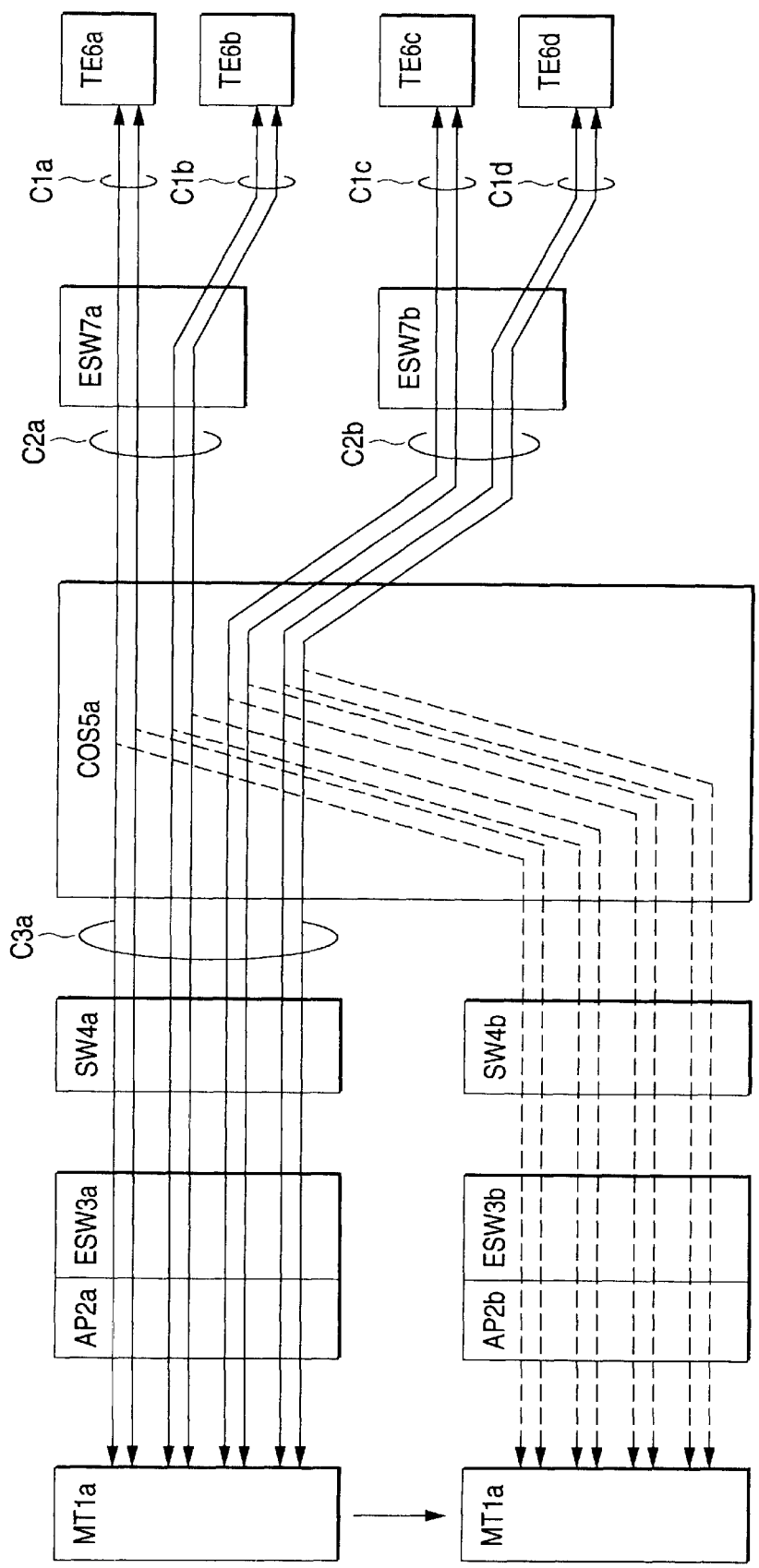
FIG. 2 is a diagram for indicating a condition of a connection in the embodiment 1 and for explaining a unit of combining a plurality of connections.

FIG. 2 is a diagram for showing an example of a unit, namely a unit for combining the setting/cutting sequences of FIG. 1 is previously determined by the system. FIG. 2 is such a case that a mobile ATM terminal owns communication terminals TE6a to TE6d, each having two VPI/VCI.

Figure 3:
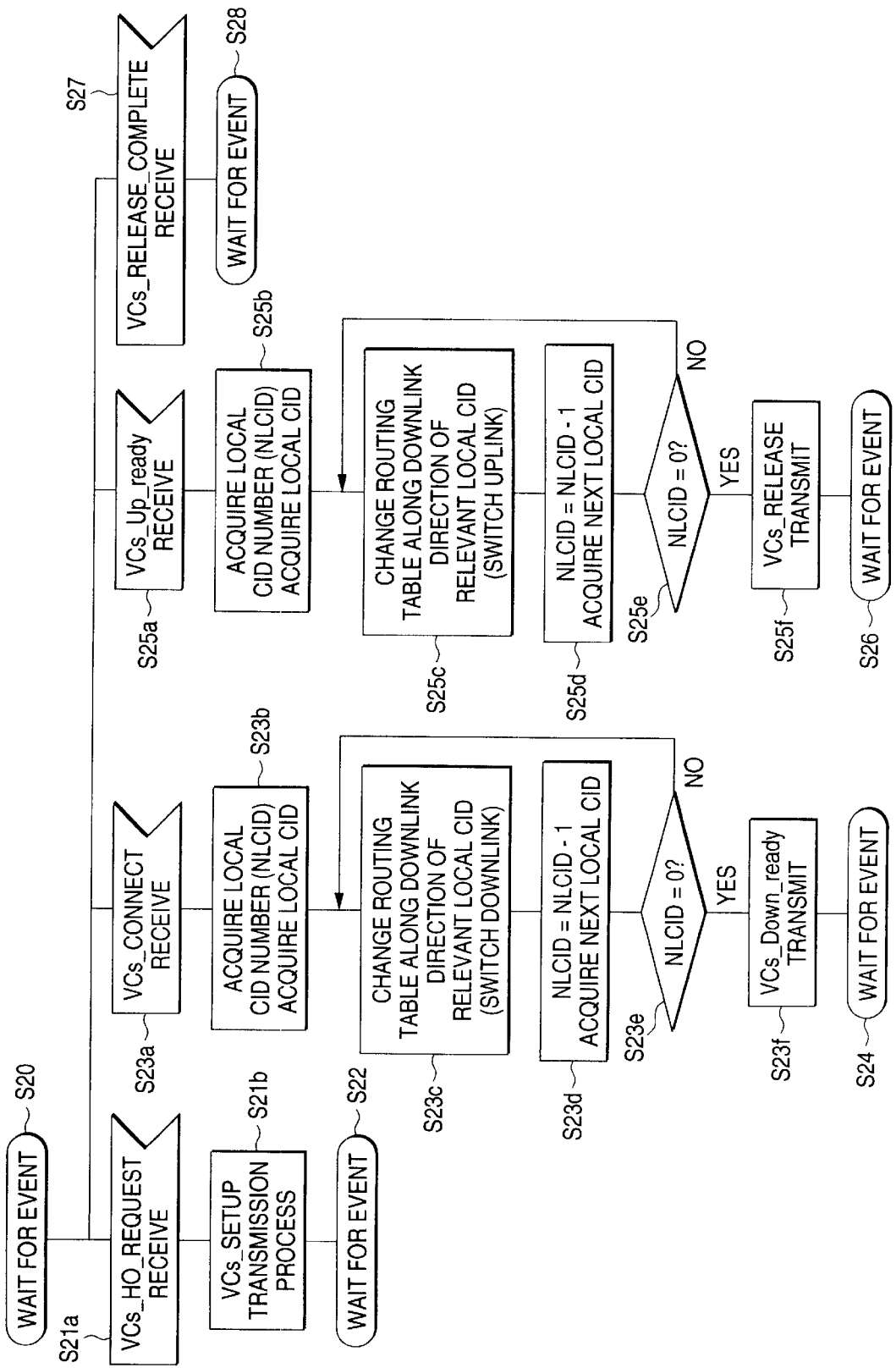
FIG. 3 is a diagram for representing an operation flow executed by a crossover switch (COS).

FIG. 3 is a flow chart for explaining operations executed by a crossover switch (COS) in this embodiment, and embodiments subsequent to the first embodiment.

FIG. 4 to FIG. 21 are diagrams for indicating information transmitted/received by the respective apparatuses indicated by corresponding titles described in the sequence of FIG. 1.

Next, operation will now be explained.

For instance, a mobile ATM terminal (MT1a) will change an access point to be connected to a radio link (namely, to hand over). As indicated in FIG. 1, setting of changing the ATM connection is carried out in such a manner that the present access point (AP)2a is changed to an edge switch (ESW)3a stored in the ATM interface, and a request of "hand over" is notified by an HO_REQUEST message shown in FIG. 7. In this case, in a local connection ID list, 8 sets of IDs are indicated every connection of FIG. 2.

The edge switch ESW3a is operated in a similar manner to that of the crossover switch COS of FIG. 3. In other words, the edge switch ESW3a sends an HO_REQUEST_ QUERY message. Shown in FIG. 9 is the edge switch (ESW)3b for storing a new access point (AP) 2b. This message inquires as to whether or not the mobile ATM terminal 1a can be handed over. The edge switch 3b responds by way of an HO_REQUEST_RESPONSE message of FIG. 10 (step S11 of FIG. 1).

In this case, the respective messages shown in FIG. 7, FIG. 9 and FIG. 10 contain information of a global connection ID (GCID) used to identify all of the ATM connections related to the "hand-over".

For instance, as indicated in FIG. 4, the global connection ID GCID is constituted by an ATM address of a mobile ATM terminal and a local connection ID defined with respect to each of the mobile ATM terminals, and is used to identify the respective ATM connections within the network. In the case that a mobile ATM terminal uses a plurality of ATM connections, as to the global connection ISD (GCID) of each of the ATM connections, the mobile terminal ATM address portion is identical to each other, and only the local connection ID portion is different from each other. As a consequence, both the list of the local connection IDs and the mobile terminal ATM addresses, but not the list of GCIDs are set to the respective messages of FIG. 8, and FIG. 11 to FIG. 21, which are indicated subsequent to the above-explained messages.

Also, information of a service quality (QoS: Quality of Service) parameter indicative of the required ranges for the respective ATM connections is added to the HO_REQUEST_QUERY message (FIG. 9) as information used to judge as to whether or not the hand-over can be accepted by a new access point and a new edge switch.

In this embodiment, it is a novel aspect to combine a plurality of IDs of the local connections ID-1 to ID-m with each other to obtain single request information. In this case, in the mobile ATM terminal 1a, as indicated in FIG. 5, the ATM connection management table as shown in FIG. 5 is owned, and a VPI (Virtual Path Identifier), a VCI (Virtual Connection Identifier), and an ATM address of a counter party terminal are managed at a certain time instant, every local connection ID of the own terminal.

Similarly, the edge switch owns an ATM connection management table as shown in FIG. 6, and manages the access point, and the information about the local connection ID, VPI/VCI every mobile ATM terminal.

Thereafter, the edge switch 3a combines the information about such ATM connections (for example C1a of FIG. 2) that the counter party ATM terminals TE6 are the same based upon the information of the ATM connection management table of FIG. 6. The edge switch 3a transmits a VCs_HO_REQUEST message of FIG. 11 to either a switch (crossover switch: COS) 5a or a switch 5b at a point where the path of the previous connection is intersected with a new path every counter party ATM terminal. FIG. 11 shows a local connection ID list every counter party ATM terminal. Then, the edge switch 3a requests to combine setting of the new ATM connections up to the edge switch 3b with respect to each of the counter party ATM terminals, namely in unit of TE6a, TE6b, TE6c, and TE6d (note that the VCs_HO_REQUEST message is sent with respect to each of the counter party ATM terminals under communication).

Both the crossover switches 5a and 5b change the tables of S23c and S25c indicated in FIG. 3, and executes transmission operations to the switches SW corresponding to S21, S23, S25. In other words, a VCs SETUP message indicated in FIG. 12 is sent to the switch 4b, and a plurality of ATM connections up to the edge switch 3b are set at the same time (steps S12a and S12b of FIG. 1).

As previously described, in the sequence diagram of FIG. 1, the information containing a plurality of local connection IDs which are displayed with VCs is transmitted/received in one sequence.

In other words, there are such novel aspects. The edge switch, the switches (SW)4a and 4b provided in a half way, and the crossover switches 5a and 5b are equipped with the mechanism for describing a plurality of IDs on the request information and the response information to the other apparatuses corresponding thereto, and also the mechanism for changing the values of the plural local IDs contained in the management table based upon the received request information.

When setting of all of the ATM connections up to the edge switch 3b is completed, both the crossover switches 5a and 5b switch the connection setting of the downlink, and then notifies this connection switching to the mobile ATM terminal 1a by way of a VCs_Down_ready message shown in FIG. 14 (in the case that setting of the ATM connection may fail, the crossover switches notify this failure by way of VCs_HO_FAILURE message of FIG. 17). Also, the crossover switches 5a and 5b switch connection setting of the uplink by way of a VCs_Up ready message of FIG. 15 sent from the mobile ATM terminal 1a. Furthermore, the edge switch 3a notifies such a fact that setting of all of the ATM connections is completed to the edge switch 3b by way of a VCs_CONN_SWITCHED message of FIG. 16. The mobile ATM terminal 1a cuts the radio link with the access point 2a to establish another radio link with the access point 2b (step S13 of FIG. 1a).

Thereafter, the mobile ATM terminal 1a requests to activate such an ATM connection handed over by a CONN_ACTIVATE message shown in FIG. 18, and the edge switch 3b notifies a list of the activated ATM connections to the mobile ATM terminal 1a by way of a VCs_CONN_ACTIVE message shown in FIG. 19 (step S14 of FIG. 1).

Then, the ATM connections which are not used between the crossover switches 5a, 5b, and the edge switch 3a are combined with each other to be cut by using a VCs_RELEASE message of FIG. 20 and a VCs_RELEASE_COMPLETE message of FIG. 21 every counter party ATM terminal (steps S15a and S15b of FIG. 1).

As previously described, the switching/setting operation of the ATM connections are completed which are combined with each other every C1a of FIG. 2 only within one sequence defined from the step S11 to the step A15b shown in FIG. 1. As a result, a total number of messages such as VCs_HO_REQUEST can be reduced, and the setting time can be shortened.

It should be understood that in the above-described embodiment shown in FIG. 1a, two sets of crossover switches 5a and 5b are described. Alternatively, any number of crossover switches may be employed.

Also, in the above-mentioned embodiment indicated in FIG. 1, the list of the local connection IDs is transmitted every counter party ATM terminal, and the local connection IDs represent the messages related to the setting/cutting operations of the ATM connections, for example, the VCs_HO_REQUEST message and the VCS_SETUP message. In other words, the respective messages are transmitted with respect to each of the ATM connections (C1a of FIG. 2) where the counter party ATM terminals are identical to each other.

Furthermore, the messages may be combined with each other every such an ATM switch (C3a of FIG. 2) whose crossover switches are identical to each other. That is, the ATM connection related to the hand-over is set/cut within one process operation per a single crossover switch.

Embodiment 2

The embodiment 1 describes such a case that the ATM connection between the crossover switch and the edge switch is again set (referred to as "path rerouting"). Alternatively, the present invention may be applied to such a case that an ATM connection between edge switches related to hand-over is extended (will be referred to as a "path extension"). Approximately, since these path rerouting and path extension have been determined in the first stage of the system design, no explanation is made of selecting any one of these operations.

Now, a description will be made of such a case that a plurality of ATM connections are set within 1 sequence in the path extension based on a sequential diagram of FIG. 22.

Figure 22:
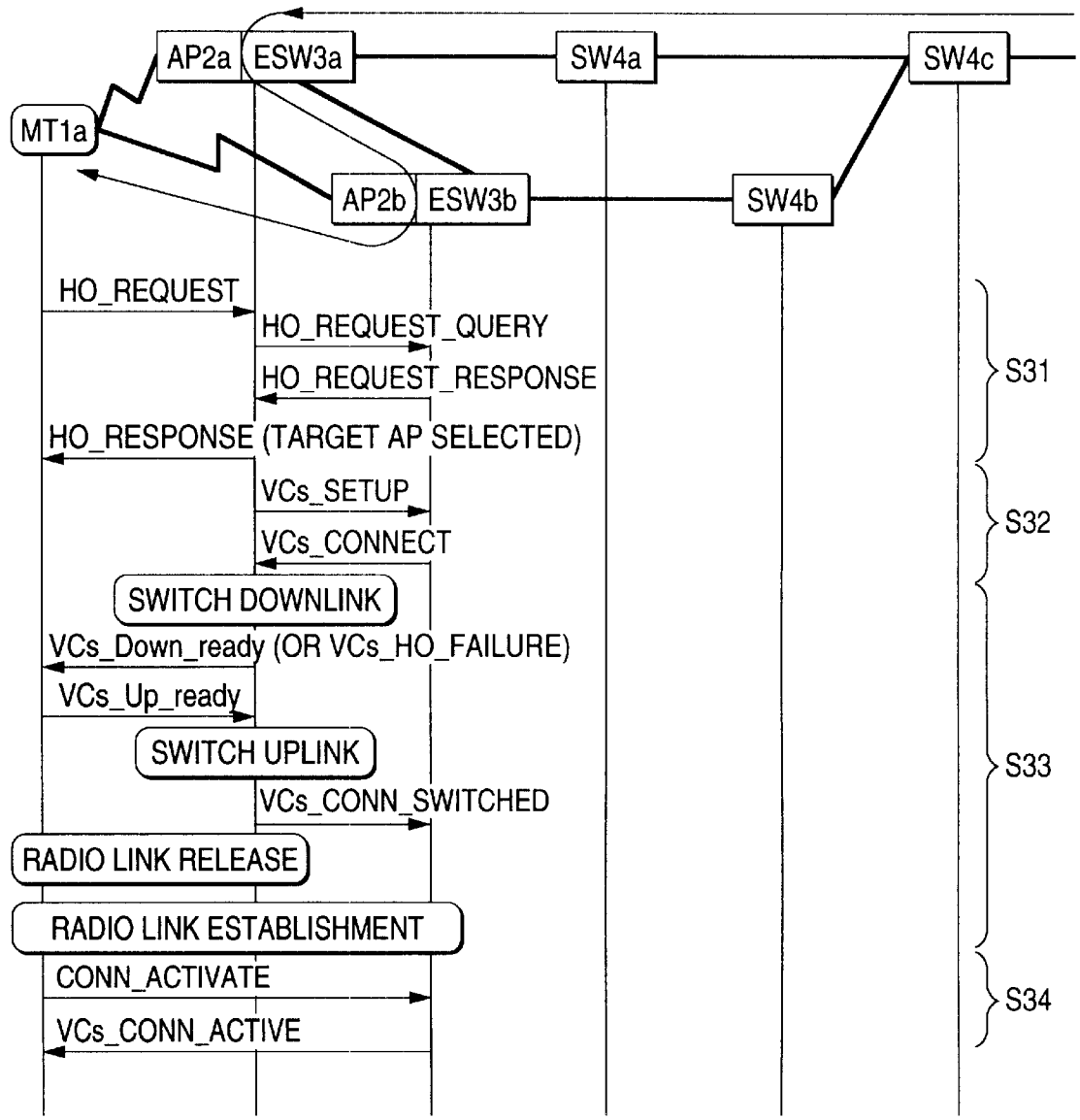
FIG. 22 is a diagram for showing a sequence operation of a plural communication setting method according to an embodiment 2 of the present invention.

For instance, as indicated in FIG. 22, an access point to which the mobile ATM terminal 1a is connected via a radio link is changed from AP2a to AP2b (namely, to hand over). To set the ATM connection extension, a request of "hand-over" is notified by way of an HO_REQUEST message of FIG. 7 to the edge switch 3a where the mobile ATM terminal 1a stores the present access point 2a by way of the ATM interface.

Thereafter, the edge switch 3a sends an HO_REQUEST_QUERY message of FIG. 9 to the edge switch 3b for storing the new access point 2b, and this message inquires as to whether or not the mobile ATM terminal 1a can be handed over. The edge switch 3b responds by way of an HO_REQUEST_RESPONSE message of FIG. 10 (step S31 of FIG. 22).

For instance, the edge switch 3a transmits a VCs_SETUP message of FIG. 11 to the edge switch 3b, and sets all of the ATM connections which have been set by the mobile ATM terminal up to the edge switch 3b at the same time (step S32 of FIG. 22).

When setting of all of the ATM connections up to the edge switch 3b is completed, the edge switch 3a switches the connection setting of the downlink, notifies this fact to the mobile ATM terminal 1a by way of a VCs_Down-ready message of FIG. 14 (in the case that setting of the ATM connection fails, this failure is notified by way of Vc_HO_FAILURE message shown in FIG. 17), and switches the connection setting of the uplink by way of a VCs_Up_ready message shown in FIG. 15 from the mobile ATM terminal 1a. Furthermore, the edge switch 3a notifies to the edge switch 3b, such a fact that setting of all of the ATM connections is accomplished by way of a VCs_CONN_SWITCHED message of FIG. 16, and the mobile terminal 1a cuts the radio link with the access point 2a so as to establish a radio link with the access point 2b (step S33 of FIG. 22).

Thereafter, the mobile ATM terminal 1a requests to activate such an ATM connection handed over by the CONN_ACTIVATE message shown in FIG. 18, and the edge switch 3b notifies a list of the activated ATM connections to the mobile ATM terminal 1a by way of the VCs_CONN_ACTIVE message shown in FIG. 19 (step S34 of FIG. 22).

Embodiment 3

The above-explained embodiment describes such a case that the mobile ATM terminal changes (namely, hands over) the access point connected in the radio link. Alternatively, either a fixed terminal or a communication terminal may set a plurality of connections prior to an establishment of a communication with a communication counter party. In other words, either the fixed terminal or the mobile terminal may set a plurality of ATM connections within one time.

Figure 23:
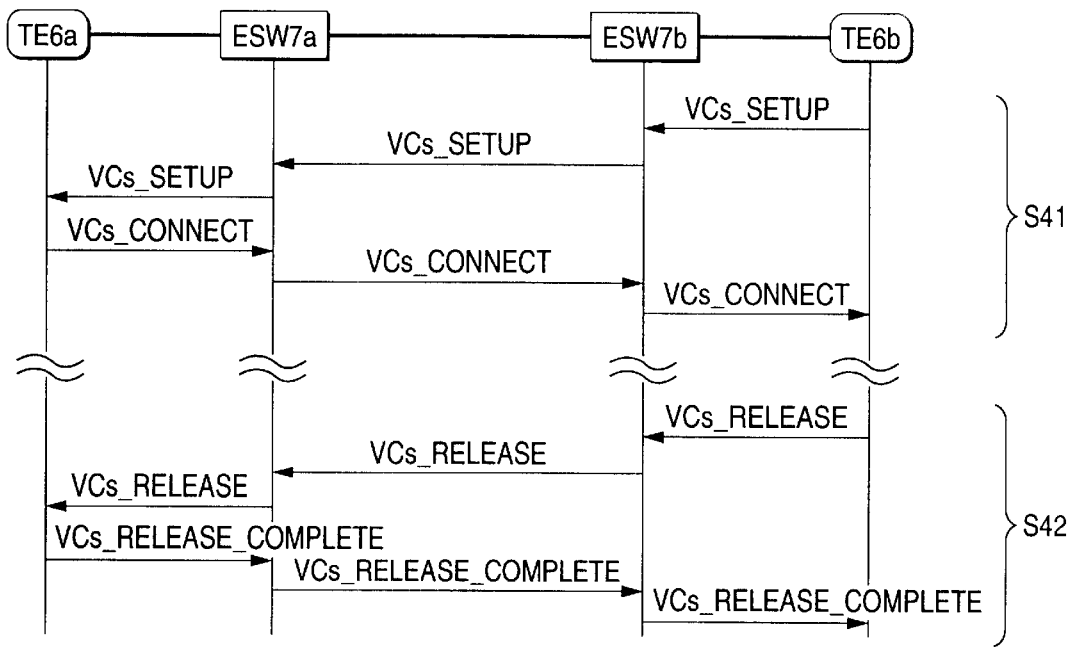
FIG. 23 is a diagram for showing a sequence operation of a plural communication setting method according to an embodiment 3 of the present invention.

FIG. 23 is a sequence diagram for representing a sequential operation executed in the respective apparatuses, for instance, edge switches in this embodiment 3. FIG. 24 to FIG. 31 show examples of messages indicated by names, or titles corresponding thereto described in the sequence diagram of FIG. 23.

Referring now to FIG. 23, a description will be made of such an operation that a fixed terminal sets a plurality of connections within one time.

Figure 24:
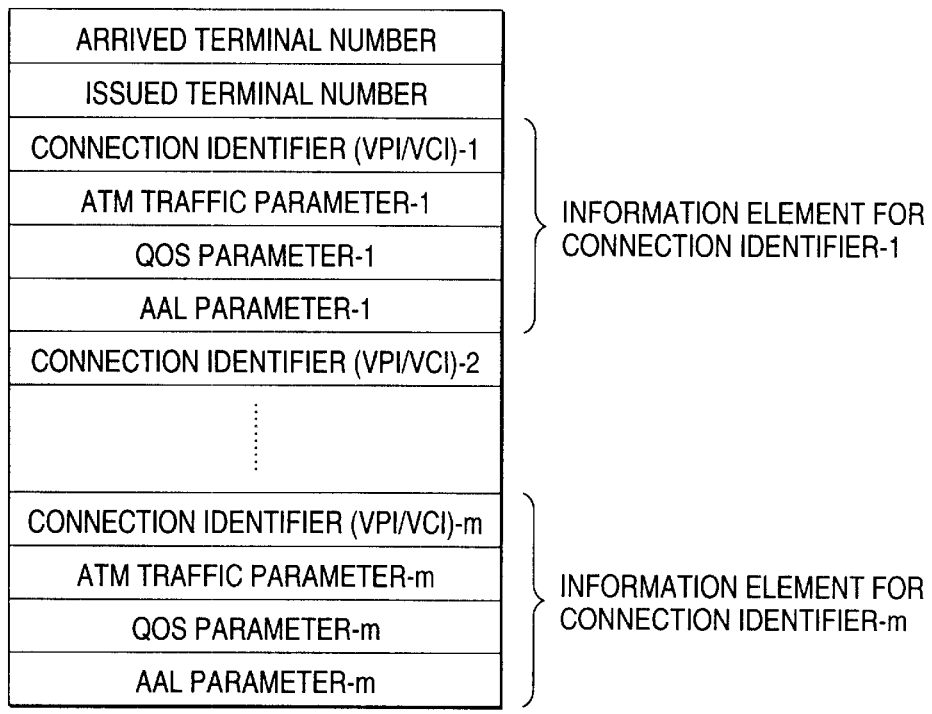
FIG. 24 is a diagram for representing an example of information required for a VCs_SETUP message in the sequence of FIG. 23.
Figure 28:
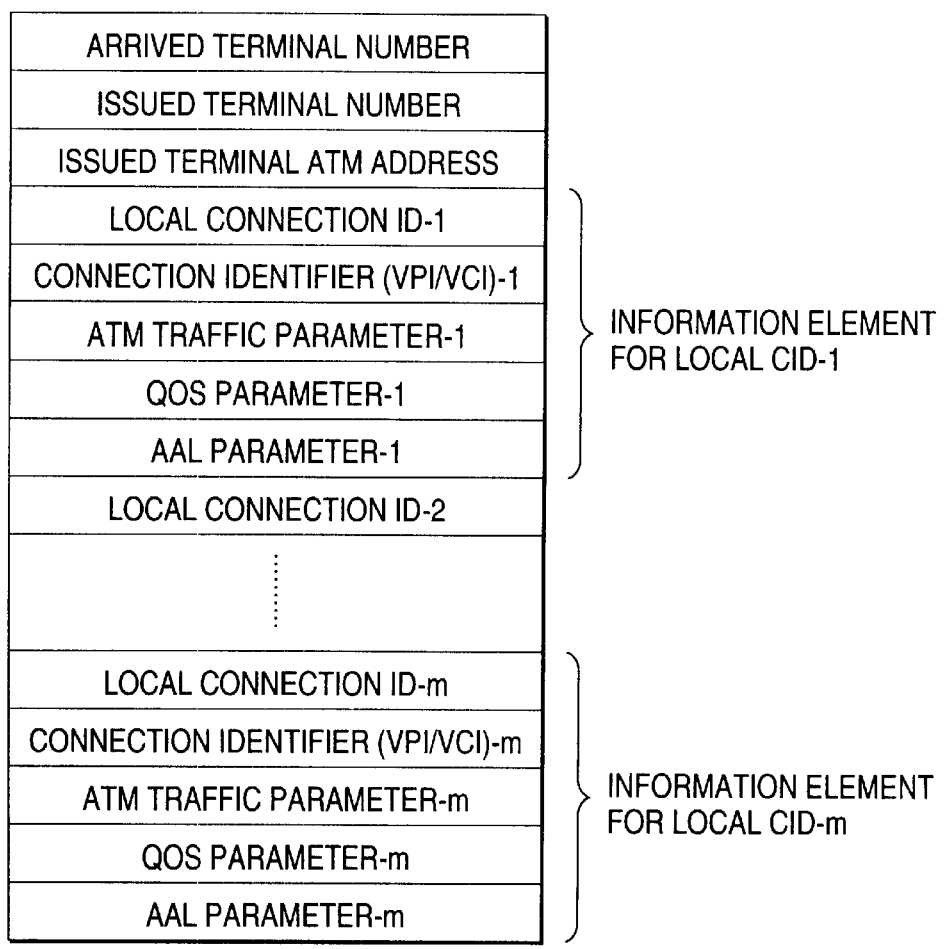
FIG. 28 is a diagram for showing an example of information required for a VCs_SETUP message in the sequence of FIG. 23.

First, in FIG. 23, in order to set a plurality of ATM connections among an ATM terminal TE 6b and another ATM terminal TE 6a, a fixed terminal TE 6b transmits a VCs_SETUP message indicated in FIG. 24 and used to request the edge switch 7b to set ATM connections.

In this VCs_SETUP message of FIG. 26, parameters and the like of the respective ATM connections which are requested to be set are with respect to each of connection identifiers.

The edge switch 7b transmits the VCs_SETUP message of FIG. 24 to the edge switch 7a for storing the fixed terminal TE 6a so as to request setting of the ATM connections within the network within one time. Furthermore, the edge switch 7a transmits the VCs_SETUP message of FIG. 24 to the counter party ATM terminal 6a so as to request setting of the plural ATM connection with the ATM terminal 6a within one time.

As represented in FIG. 23, since the ATM terminal 6a and the edge switches 7a, 7b respond by way of a VCs_CONNECT message of FIG. 25, a plurality of ATM connections can be set between the ATM terminals 7b and 7a within a single process operation (step S41 of FIG. 23).

Similarly, since a VCs_RELEASE message of FIG. 26 and a VCs_RELEASECOMPLETE message of FIG. 27 are used, a plurality of ATM connections can be cut within one time (step S42 of FIG. 23).

As described above, there are provided such a mechanism for describing a plurality of IDs in the messages transmitted/received among the respective apparatuses, and another mechanism for changing the information corresponding to a plurality of ID values of the management table in the respective apparatuses corresponding thereto. As a result, either the fixed terminal or the mobile terminal can accomplish setting of a plurality of ATM connections within one sequential operation.

Also, in accordance with the above-described connection and sequential operation shown in FIG. 23, such a description has been made of the method without using GCID, as previously explained in FIG. 1 and FIG. 22. Instead of the respective messages shown from FIG. 24 to FIG. 27 which are used to set/cut the ATM connection, the ATM connections may be set by using GCID since the respective messages of FIG. 28 to FIG. 31 are used.

Also, in the sequential operation of FIG. 23 in the embodiment 3, a plurality of connections are set at the same time between the fixed terminal and the communication node. Alternatively, the present invention may be applied to again set (switching-set) the connections within the network (among communication nodes) caused by the failure occurred in the network.

Figure 32:
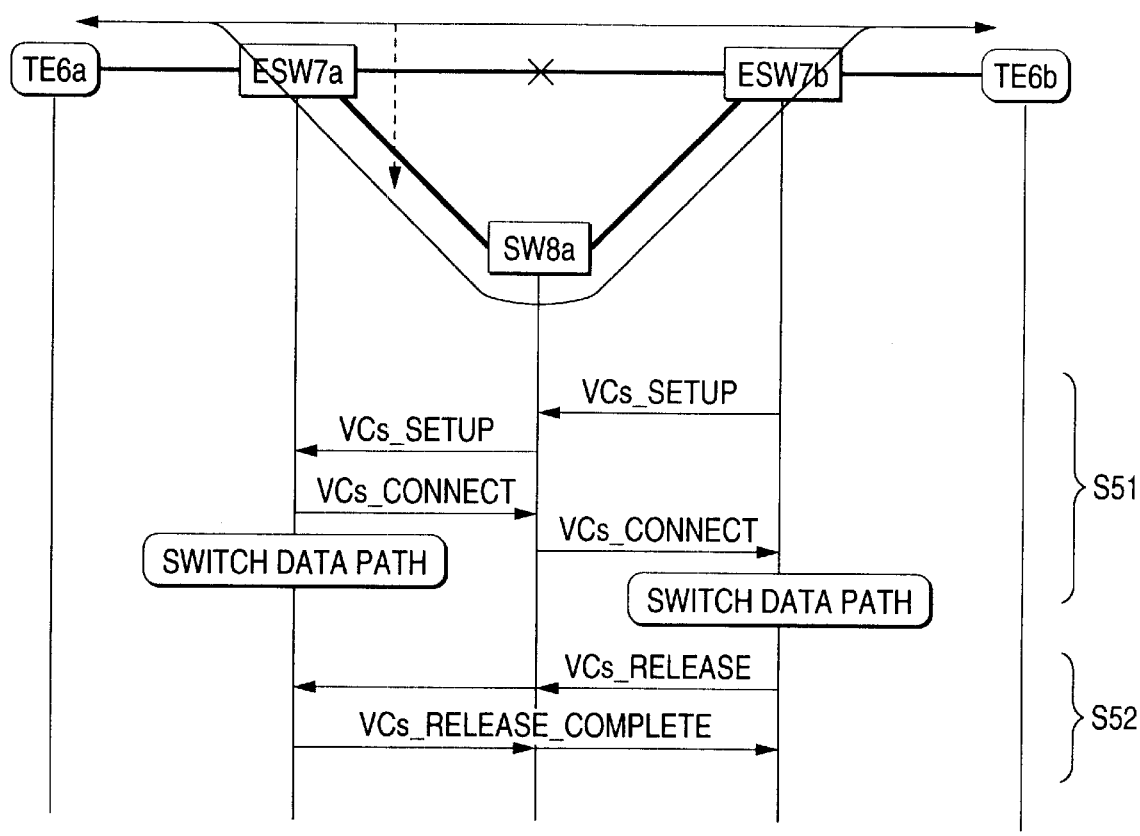
FIG. 32 is a diagram for indicating a sequential operation of a plural communication connection setting method according to another example of the embodiment 3.

FIG. 32 is a diagram for representing a sequential operation to switching-set connections FIG. 33 to FIG. 36 are diagram for indicating example of messages indicated as names, or titles corresponding thereto and described in the sequential diagram of FIG. 32.

Figure 33:
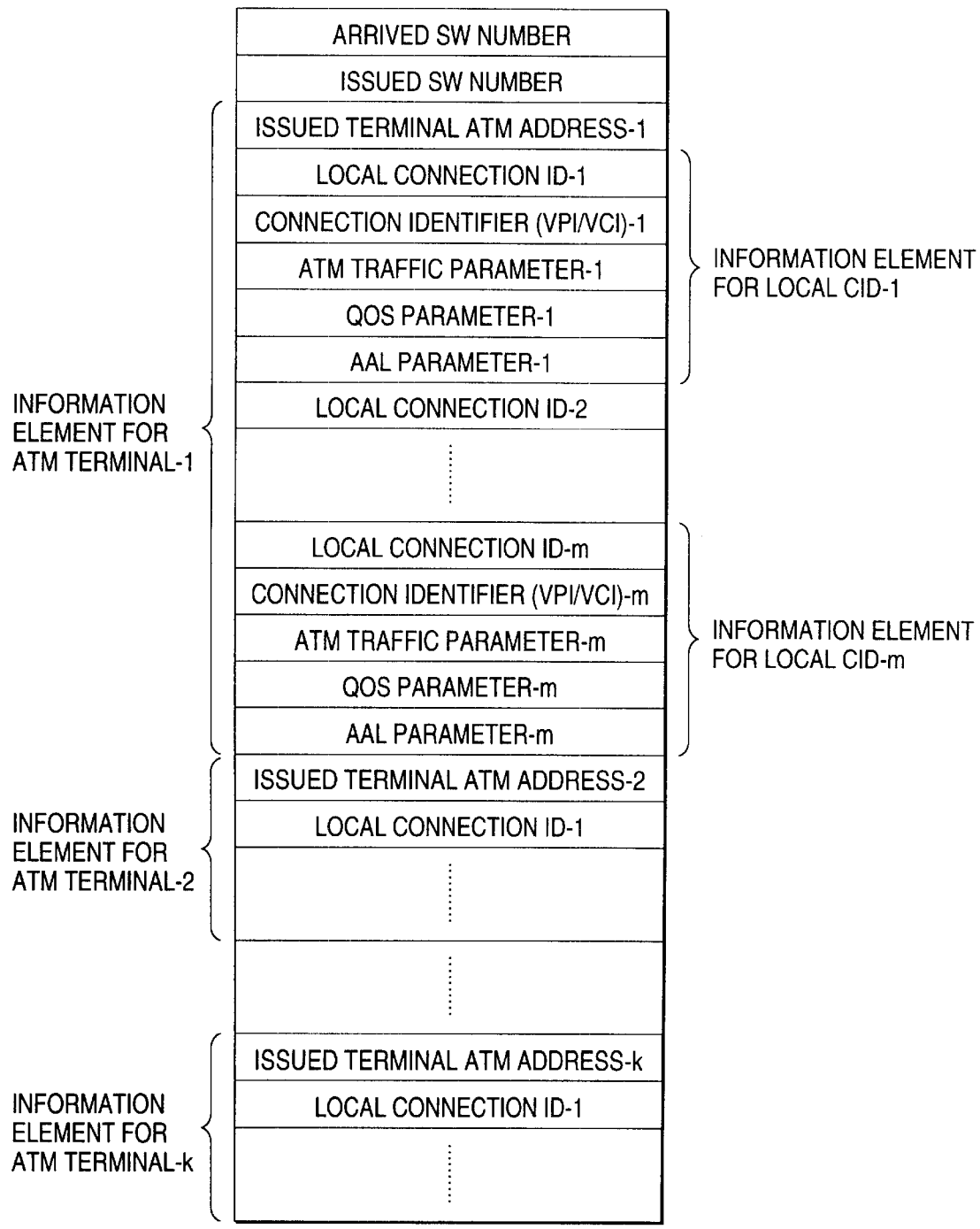
FIG. 33 is a diagram for representing an example of information required for a VCs_SETUP message in the sequence of FIG. 32.

For instance, as indicated by symbol "X" of FIG. 32, in the case that a failure happens to occur in a line connected between the edge switches 7a and 7b, the edge switch 7b transmits a VCs_SETUP message shown in FIG. 33 to a switch 8a in order to again set the ATM connection which has used the failure line via the switch 8a, and requests to set a plurality of ATM connections within one time.

In the VCs_SETUP message, parameters and the like of the respective ATM connections which require the connection setting operation are set with respect to each of the local connection IDs every issuing ATM terminal (namely, terminal for commencing setting operation of connection).

The switch 8a transmits the VCs_SETUP message of FIG. 33 to the edge switch 7a so as to request setting of plural ATM connections. Both the edge switch 7a and the switch 8a respond by way of a VCs_CONNECT message of FIG. 34, as indicated in FIG. 32, so that a plurality of ATM connections can be set between the edge switches 7b and 7a within one process operation (step S51 of FIG. 32).

Figures 36, 37:
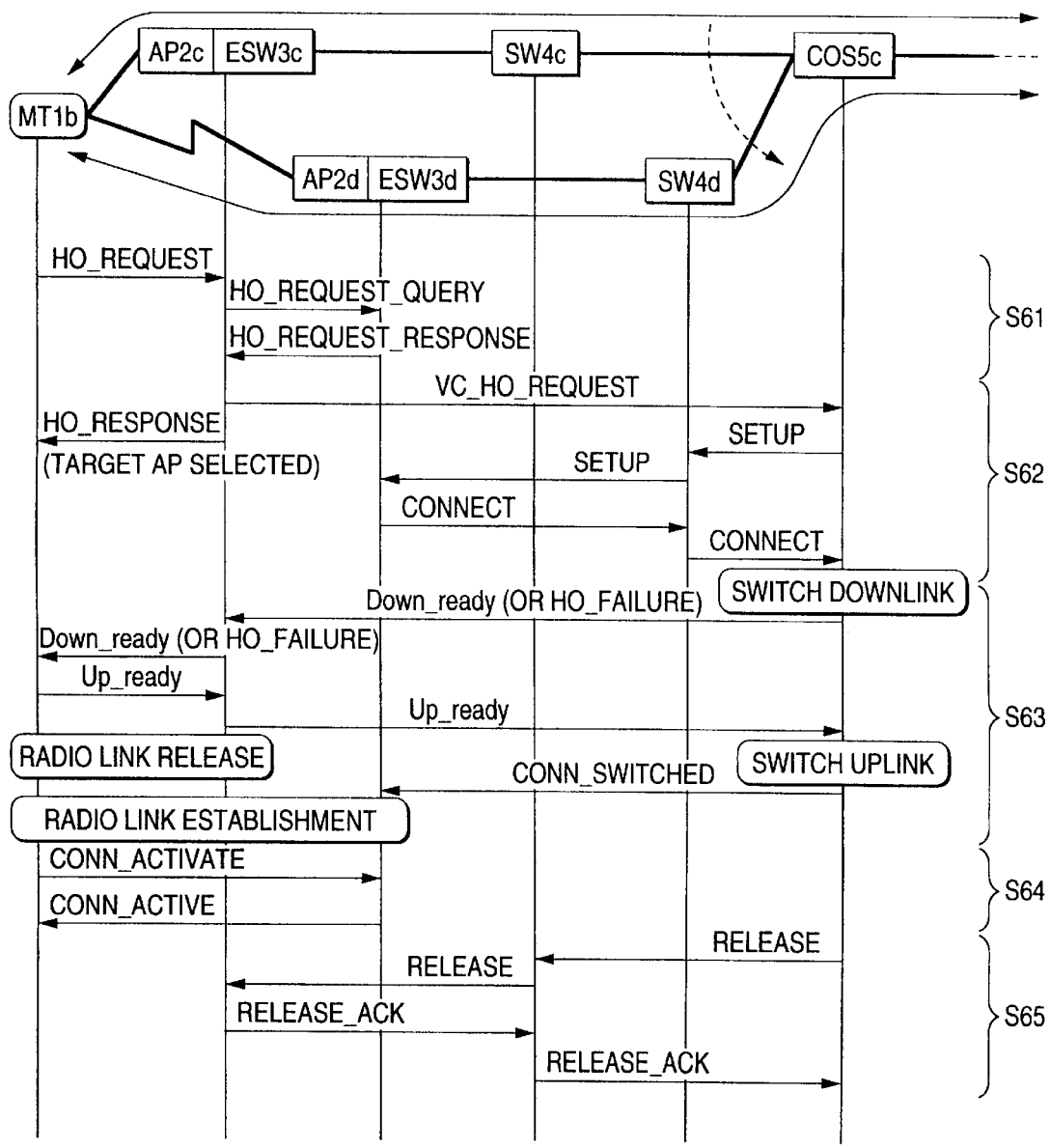
FIG. 36 is a diagram for showing an example of information required for a VCs_RELEASE_COMPLETE message in the sequence of FIG. 32.
FIG. 37 is a diagram for showing the sequential operation of the conventional communication connection setting method.

Thereafter, since a VCs_RELEASE message of FIG. 35 and a VCs_RELEASECOMPLETE message of FIG. 36 are used, the ATM connection information previously set between the edge switches 7b and 7a can be deleted within one time (step S52 of FIG. 32).

In the above-explained connection shown in FIG. 32, the previously set ATM connection information is clearly deleted by the step S52. Alternatively, since the terminal ATM address and the local connection ID (namely, GCID) are set to either the VCs_SETUP message of FIG. 33 or the VCs_CONNECT message of FIG. 34, the previously set ATM connection information may be tacitly deleted in the step S51 without executing the step S52 of FIG. 32.

Also, in the connection shown in FIG. 32, the failure occurred in the line between the edge switches is described. Alternatively, the present invention may be applied to another operation such that the connection may be again set due to a failure occurred in a line between switches other than the edge switches, namely due to a failure occurred in the network other than the above-described line failure between the edge switches.

In the connection shown in FIG. 32, all of the ATM connections set between the edge switches 7a and 7b are again set via the switch 8a. Alternatively, if there are provided a plurality of replacement paths, then the connections may be distributed to these placement paths and may be again set.

As previously explained, in accordance with the communication connection setting method of the present invention, since the plural ID requesting step, the rewriting step, and the plural ID responding step are employed. As a result, even when a plurality of connections are set, there are such effects that a total number of messages to be transmitted/received can be reduced, and furthermore, the time required to set a plurality of communication connections can be shortened.

Moreover, since when the connections are cut, the process operation for the plural IDs is carried out within one sequential operation, there is another merit that a total number of cutting messages of the plural connections can be reduced and also the message cutting time can be shortened.

In addition, since the ID and the communication parameter value are selected to be the terminal address and the local connection ID, there is a further effect that the information amount can be reduced.

What is claimed is:

1. A method of setting plural communication connections within a communication, comprising the steps of:

setting a plurality of connection identifiers that require the change-over of a communication line and communication parameters to one message and sending the message to a crossover switch that implements the change-over of a relay switch that requires the change-over of the communication line;

requesting the setting of a plurality of connections to the relay switch according to the one message that sets the plurality of connection identifiers and communication parameters by the crossover switch that implements the change-over;

rewriting a routing table with respect to the plurality of connections by the crossover switch upon completion of setting the plurality of connections with respect to a plurality of relay switches to be changed over; and thereafter transmitting a response message that sets a plurality of connection identifiers for those relay switches that have been changed over by the crossover switch.

2. The method according to claim 1, further comprising:

setting a plurality of connection identifiers to be cut to the one message and transmitting the one message to the change-over relay switch by the crossover switch; and cutting a plurality of connections upon receiving one message and transmitting the response message that sets the plurality of connection identifiers that have been cut to the crossover switch by the change-over relay switch.

3. The method of claim 2 wherein the communication terminal is a mobile terminal and the relay switch includes an edge switch and an access point forming a communication destination wherein the edge switch performs the sending, requesting, storing and setting operations.

4. The method according to claim 1 or 2, wherein the plurality of connection identifiers set to one message are disposed for each of the communication destination terminals, and the connections are set and cut for every communication destination terminals.

5. The method according to claim 1 or 2, wherein the plurality of connection identifiers set to the one message are disposed for each of the plurality of relay a switches connected to the communication destination terminal, and the connections are set and cut for said plurality of relay switches.

6. The method according to claim 1 or 2, the plurality of connection identifiers set to the one message are disposed for each of a plurality of cross-over switches where a new path and an old path cross each other, and the connections are set and cut for said plurality of crossover switches.

7. the method of claim 1, wherein the identification numbers is a list of terminal addresses and a local connection identification.

* * * * *